W. JONES.
Potato-Digger.
No. 40,842. Patented Dec. 8, 1863
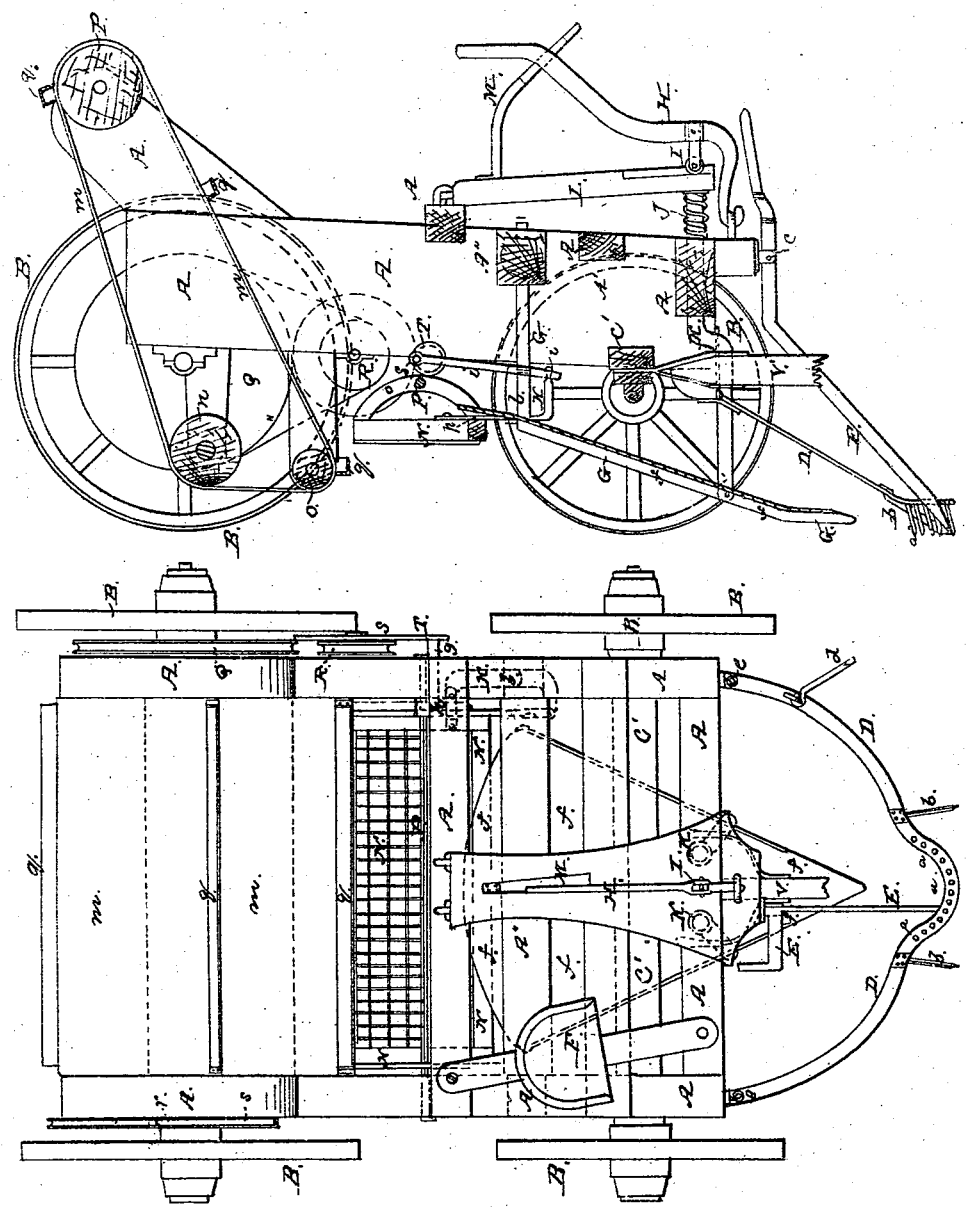
WITNESSES:
INVENTOR:

UNITED STATES PATENT OFFICE.

WILLIAM JONES, OF ST. LOUIS, MISSOURI.

IMPROVEMENT IN POTATO-DIGGERS.

Specification forming part of Letters Patent No. 40,842, dated December 8, 1863.

*To all whom it may concern:*

Be it known that I, WILLIAM JONES, of the city and county of St. Louis, and State of Missouri, have invented a new and Improved Potato-Digger; and I do hereby declare the following to be a full, clear, and exact description of the same, reference being had to the annexed drawings, making part of this specification, in which—

Figure 1 is a top view of my said invention, and Fig. 2 is a vertical section taken on the line A′ A′ of Fig. 1.

The object of my invention is to produce a more efficient machine for the purpose of digging and gathering potatoes; and it consists in a novel arrangement and combination of mechanical devices, whereby the vines and weeds are raked and cut away from the hills or rows of potatoes, and by which the potatoes are taken out of the ground, separated from the dirt, and delivered into a box or cart attached to the rear part of the machine to receive them.

To enable others skilled in the art to which my invention appertains to make and use the same, I will proceed to describe the construction and operation thereof.

The frame of my machine is represented in the drawings by A. It may be made in the form and proportion indicated in the drawings, or of such other form and proportion as experience and convenience may dictate. Said frame is mounted upon wheels B B, the axles whereof are shown by C C.

To the front end of the frame is attached by means of hinged joints what I denominate the "clearer." It consists of a bar of metal, D, made about in the form shown in the drawings, and with a series of teeth, *a*, fixed in the front bend, and a pair of knives, *b b*, arranged one on each side of the teeth. The said knives are intended to separate the vines on each side of the row, and the teeth are to gather the vines so as to clear them away from before the digger. Said clearer is operated by means of a bar, E, which has its fulcrum at *c* in the frame, and which is controlled by the driver sitting in his seat F. Said clearer, when not in use, is raised up off the ground and secured by means of the hooks *d* in the staples *e*, secured in the end of the arm.

Under the front end of the machine is arranged and secured the digger G. Said digger consists, first, of a pair of metal bars made in the form of a triangle, and with their rear ends turned up and passed through the rock-shaft A″, as shown in the drawings, and are there secured; and the front end of said triangle is fashioned somewhat in the form of a share to give it an easy entrance to and passage through the ground; and said digger consists, second, of a thin perforated plate, *f*, with which said triangular frame is covered, and the edges whereof are turned up in the form of a flat-bottomed scoop. The said digger is operated—that is, raised and lowered in and out of the ground—by means of the lever H, which acts upon a hinged bed-piece, L, the front end whereof is supported on a pair of rods, K, which pass down through the frame and are attached to the digger, as shown. On the upper ends of said rods K collars are made, under which coil-springs J are placed, so as to act between said collars and the top of the frame so as to press up the rod, and consequently raise the digger out of the ground as soon as the lever H is released, by which the springs are compressed and the digger forced into the ground. The lever H, it will be seen, is placed within reach of the driver, so as to be readily controlled, and is secured by means of a ratchet-bar, M, as shown. The fulcrum of said lever consists of a short arm, I, in the lower end of which a small wheel is fixed to roll in a groove cut in the plate L.

About under the center of the frame the sifter N is arranged, by which the dirt is separated from the potatoes. Said sifter is a common open-work screen, and may be made of any suitable material. It has a plate, O, fixed on each end, through which a bar, P, passes, whereon said sifter has a lateral reciprocating motion, which motion it receives through the agency of the band-wheel Q, fixed on the rear axle, there being a band leading from said wheel to a small band-wheel, R, which actuates a cog-wheel, S, placed on the axles of the last-mentioned wheel, and fixed to it. This cog-wheel gears into a pinion-wheel, T, fixed on a crank-shaft, *g*, which carries on its opposite end a crank-wheel, *h*, to which is connected, through the agency of the connecting-rod *i* and link *j*, the lever K, which vibrates about a center, *l*, fixed to the under side of the frame. The opposite end of said lever is attached to the said sifter, whereby it receives its motion.

In the rear end of said frame is arranged an endless apron, m, over the rollers n o p, supported in suitable bearings made on or in the frame, as shown by the drawings, or in any other convenient way which will fill the object sought after. Or the said apron-carriers q q q are placed as near as may be thought necessary. Into these carriers the potatoes are deposited off of the sifter, and by them they are carried up and thrown over into a box hooked on the back end of the frame. Said box is not shown in the drawings. Said apron receives its motion from a band-wheel, v, fixed on the rear axle, from whence a band is led to a corresponding wheel fixed on the roller D.

V represents the tongue, to which the power is applied to draw the machine.

When said machine is in operation the potatoes are dug out by the digger G, over which they are shoved into the sifter N, where they are cleared of the dirt and deposited in the carriers, and by them in the box or cart placed there to receive them.

Having now described the construction and operation of my machine, what I claim as new therein, and desire to secure by Letters Patent, is—

1. The clearer D, arranged on the front end of the machine, and combined with the bar E for operating the same, the whole to be constructed and arranged substantially in the manner set forth.

2. The rods K and springs J, in combination with the hinged platform H, as and for the purpose set forth.

3. In combination with the digger G, the sifter N, constructed, arranged, and operated as set forth.

4. In combination with the digger and sifter constructed as set forth, the endless apron m for the purpose of receiving and delivering the potatoes, as described.

WILLIAM JONES.

Witnesses:
   THOMAS L. SALISBURY,
   JORDAN J. MONTGOMERY.